United States Patent [19]

Nagano

[11] Patent Number: 4,928,549
[45] Date of Patent: May 29, 1990

[54] PEDAL FOR A BICYCLE
[75] Inventor: Masashi Nagano, Izumi, Japan
[73] Assignee: Shimano Industrial Company Limited, Osaka, Japan
[21] Appl. No.: 241,356
[22] Filed: Sep. 7, 1988
[30] Foreign Application Priority Data
  Sep. 10, 1987 [JP] Japan .................. 62-227703
  Aug. 30, 1988 [JP] Japan .................. 63-217263
[51] Int. Cl.$^5$ ............................. G05G 1/14
[52] U.S. Cl. .................. 74/594.6; 74/594.4; 36/131; 280/11.3
[58] Field of Search ........... 74/594.4, 594.6, 594.1, 74/594.2, 594.3, 560; 36/131, 132, 117, 120, 122; 280/11.3, 11.31, 11.32, 11.33, 11.34

[56] References Cited
U.S. PATENT DOCUMENTS

| | | | |
|---|---|---|---|
| 2,567,754 | 9/1951 | Almorth | 280/11.32 |
| 3,026,118 | 3/1962 | Pare | 280/11.3 |
| 3,788,163 | 1/1974 | Gause et al. | 74/594.6 |
| 4,089,236 | 5/1978 | Genzling | 74/594.6 |
| 4,488,453 | 12/1984 | Drugeon et al. | 74/594.6 |
| 4,646,586 | 3/1987 | Rapisarda | 74/594.6 |
| 4,686,867 | 8/1987 | Bernard et al. | 74/594.6 |
| 4,762,019 | 8/1988 | Beyl | 36/131 X |

FOREIGN PATENT DOCUMENTS

| | | | |
|---|---|---|---|
| 17592 | 3/1882 | Fed. Rep. of Germany | 280/11.33 |
| 3722192 | 1/1988 | Fed. Rep. of Germany | 74/594.6 |
| 60-197478 | 10/1985 | Japan | 74/594.6 |

Primary Examiner—Vinh Luong
Attorney, Agent, or Firm—Stevens, Davis, Miller & Mosher

[57] ABSTRACT

A bicycle pedal includes a swinging member pivoted to the pedal body such that it is swingable at its upper portion in a direction of moving toward or away from the pedal body. A movable pawl is pivoted to the upper portion of the swinging member, and both the swinging member and movable pawl are biased by a spring in the direction of moving toward the pedal body. The movable pawl and swinging member swing relative to the pedal body to enable a shoe plate attached to a shoe of a cyclist to be mounted onto or dismounted from the pedal body.

7 Claims, 6 Drawing Sheets

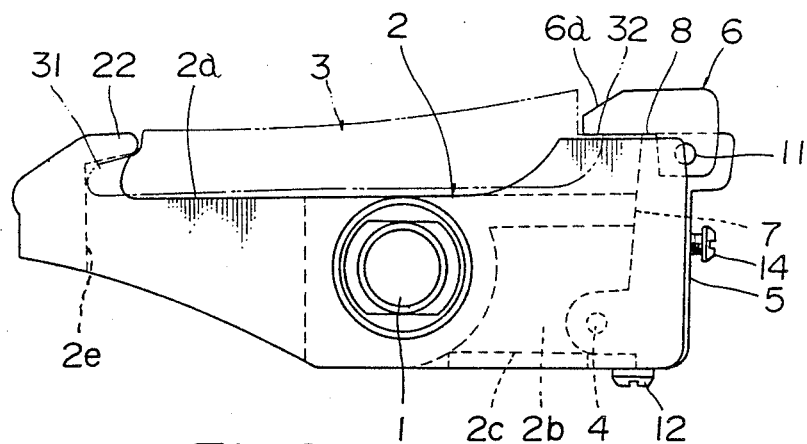
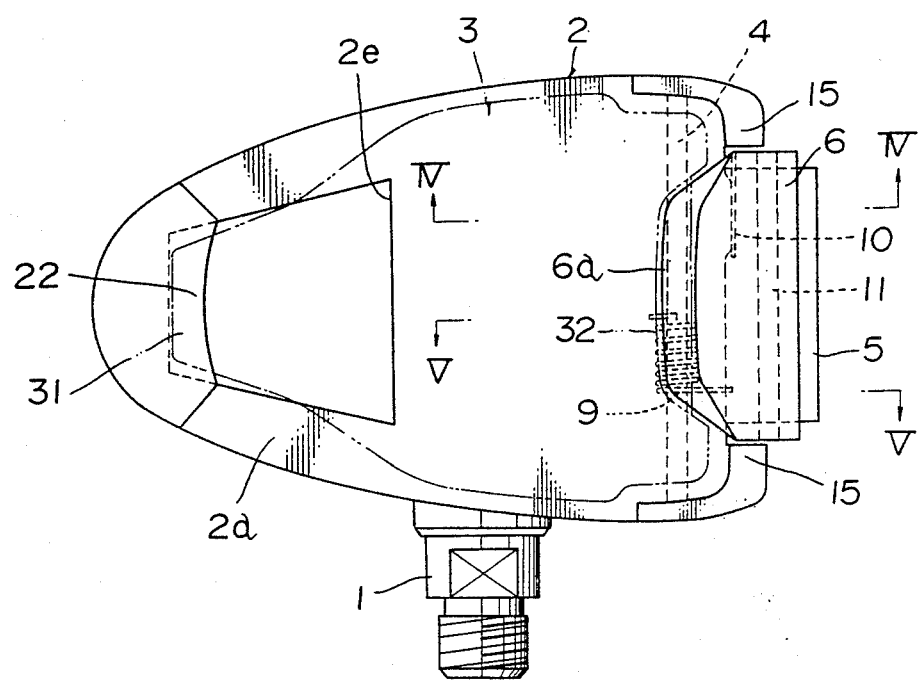

PEDAL FOR A BICYCLE

FIELD OF THE INVENTION

The present invention relates to a pedal for a bicycle, and more particularly, to a pedal for a bicycle, which is used with a shoe plate fixed to the sole of a shoe worn by a cyclist and having front and rear portions provided with engaging portions respectively.

BACKGROUND OF THE INVENTION

Conventionally, this kind of pedal, as disclosed in Japanese Patent Laid-Open Gazette No. Sho 60-197,478, is provided with a pedal body rotatably supported to a pedal shaft, a fixing pawl provided at the front of the pedal body for retaining a front engaging portion of a shoe plate fixed to the sole of a cyclist's shoe, a movable pawl disposed at the rear of the pedal body, with the movable pawl being actuated to interfere with the movement of the shoe plate when subjected to a treading force and being rearwardly swingable with respect to the pedal body. A compression spring is provided between the movable pawl and the pedal body for forwardly biasing the movable pawl.

To position the shoe plate and shoe in the pedal body, the shoe plate is retained at its front engaging portion to the fixing pawl and then placed on the foot bearing surface of the pedal body to allow the rear engaging portion of the shoe plate to abut against the upper surface of the movable pawl. In this condition the cyclist treads the shoe toward the pedal body to swing the movable pawl rearwardly with respect to the pedal body against the spring, while the rear engaging portion of the shoe plate enters into the fore end portion of the movable pawl. The movable pawl is restored in position by the spring force, and the rear engaging portion of the shoe plate engages with the movable pawl, thereby holding the shoe plate to the pedal body. Thus, the shoe plate fixed to the sole of the shoe is mounted on the pedal. On the other hand, to dismount the shoe plate and cyclist's shoe from the pedal, the shoe is twisted laterally around the retained position of the shoe plate to the fixing pawl with respect to the pedal body so as to swing the movable pawl rearwardly against the compression spring, thereby disengaging the rear end of the shoe plate from the movable pawl and removing the shoe plate from the pedal body.

Such conventional pedal, however, has the movable pawl pivoted directly to the pedal body and requires the compression spring to deflect to swing the movable pawl rearwardly with respect to the pedal body when the shoe plate is mounted or dismounted to or from the pedal. As a result, in order to prevent the shoe plate from unexpectedly dislodging from the pedal, the spring force must be set quite large. However, this large spring force requires a large treading force to mount the shoe plate on the pedal, with the result that the shoe plate is difficult to mount, thereby greatly restricting the degree of design freedom. Accordingly, in the conventional pedal, the shoe plate, when easy to mount, becomes difficult to remove, or conversely, when easy to remove, becomes difficult to mount.

SUMMARY OF THE INVENTION

In light of the above problem, the present invention has been designed. An object thereof is to provide a pedal for a bicycle which can simply increase the degree of design freedom and in which the shoe plate can be made alternatively easy to mount and hard to remove, hard to mount and easy to remove, and easy to mount and remove, and also in which the shoe plate can be mounted or removed by a simply operation of downward treading and upward raising of the shoe heel of the cyclist.

The present invention provides a pedal for a bicycle which is adapted to be used together with a shoe plate fixed to the sole of a cyclist's shoe and provided at its front and rear portions with front and rear engaging portions respectively. The pedal comprises a pedal shaft and a pedal body rotatably supported to the pedal shaft. The pedal body is provided at its front portion with a fixing pawl for retaining the front engaging portion of the shoe plate and at it rear portion with a swinging member which swings at its upper portion toward or away from the pedal body. A movable pawl projecting at its utmost end toward the pedal body and retaining the rear engaging portion of the shoe plate is pivoted to the upper portion of the swinging member to be swingable toward or away from the pedal body. Stoppers are provided at the pedal body for regulating the respective swinging motions of the swinging member and the movable pawl. The pedal body also includes impeding means for impeding the shoe plate from rearward movement with respect to the pedal body, and biasing means for biasing the swinging member and movable pawl toward the respective stoppers.

In the pedal according to the invention, the shoe plate is mounted to the pedal body such that after the fixing pawl retains the front engaging portion of the shoe plate, the cyclist applies a treading force to the rear end of the shoe plate so that the swinging member escapes or dislodges from the pedal body against the force applied by the biasing means, while the rear engaging portion of the shoe plate is then retained to the movable pawl. On the other hand, during dismounting, the rear portion of the shoe plate is raised from the pedal body so that the movable pawl pivots relative to the swinging member to escape therefrom, thereby removing the shoe plate from the pedal body. Hence, the invention provides a swinging member formed as a separate member from the movable pawl to make the shoe plate alternatively, as desired to meet various specifications, easy to mount and hard to remove, hard to mount and easy to remove, or easy to mount and to remove, thereby enabling the degree of design freedom to be increased to that extent. Hence, according to the invention, a pedal to meet a particular design requirement can be simply provided.

The above and further objects and novel features of the invention will be more fully apparent from the following detailed description when the same is read in connection with the accompanying drawings.

BRIEF DESCRIPTION OF THE DRAWINGS

FIG. 1 is a front view of the first embodiment of a pedal of the invention;

FIG. 2 is a plan view of the first embodiment;

DETAILED DESCRIPTION OF THE PREFERRED EMBODIMENTS

Figure 3:
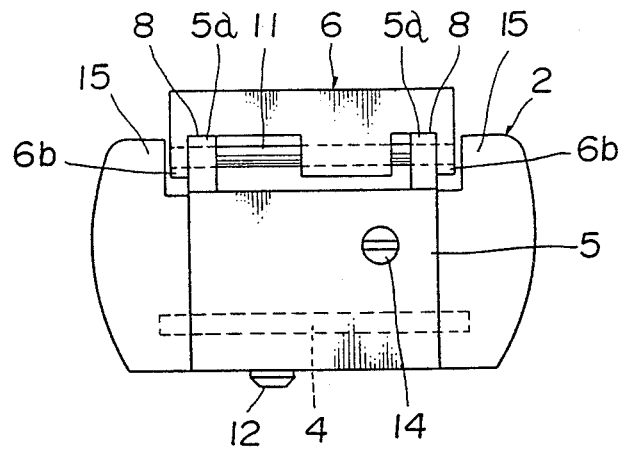
FIG. 3 is a side view of the first embodiment.

The pedal of the invention is used together with a shoe plate 3 fixed to the sole of a cyclist's shoe and having at front and rear portions thereof engaging portions 31 and 32 respectively. The pedal comprises a pedal shaft 1 mounted on a free end of a crank arm at a crank means of the bicycle and a pedal body 2 rotatably supported to pedal shaft 1. Pedal body 2 has at its upper surface a foot bearing surface, at its rearwardly lower portion a void or space 2b, and at a lower surface of a side wall constituting void 2b a cover 2c for covering void 2b.

In the first embodiment shown in FIGS. 1 through 7, a fixing pawl 22 engageable with front engaging portion 31 of shoe plate 3 is provided at the front of the pedal body 2. A pivot shaft 4 is provided across the lower portions of the side walls constituting void 2b, and a vertically extending swinging member 5 is pivoted at its lower end to pivot shaft 4 such that when swinging member 5 pivots on shaft 4, the upper portion of swinging member 5 moves rearwardly away from pedal body 2. A movable pawl 6 projecting at its fore end toward pedal body 2 and retaining rear engaging portion 32 of shoe plate 3 is pivoted to the upper portion of swinging member 5 such that it is capable of moving at its fore end upwardly and slantwise rearwardly away from pedal body 2. At the rear end edge of pedal body 2 is provided first stopper 7 for regulating a range of forward swinging motion of swinging member 5, i.e., its swinging motion toward pedal body 2. At the upper end face of swinging member 5 are provided second stoppers 8. A first spring 9 for biasing swinging member 5 toward first stopper 7 is provided between swinging member 5 and pedal body 2, and a second spring 10 for biasing movable pawl 6 toward second stoppers 8 is provided between movable pawl 6 and swinging members 5. In addition, an impeding means for impeding shoe plate 3 from rearward movement with respect to pedal body 2 is provided at pedal body 2.

Swinging member 5, as shown in FIG. 3, is formed with a size sufficient to close void 2b of pedal body 2. A pair of risings 5a are provided at the upper surface of both widthwise ends of swinging member 5, with risings 5a projecting upwardly as shown in FIG. 3. Movable pawl 6 is pivoted to swinging member 5 through a shaft 11 provided across rising 5a, and the upper surfaces of risings 5a serve as second stoppers 8 respectively.

The upper front surface of swinging member 5 abuts against first stopper 7 as shown in FIG. 1. Movable pawl 6, as shown in FIG. 3, is larger in width than swinging member 5 and is provided at the upper surface of its fore end with a slope 6a inclined forwardly and slantwise downwardly and at both of its widthwise ends with a pair of mounting projections 6b downwardly projecting and pivotally supporting risings 5a through shaft 11. Movable pawl 6 abuts at the lower surfaces inside risings 5a against second stoppers 8.

Figure 5:
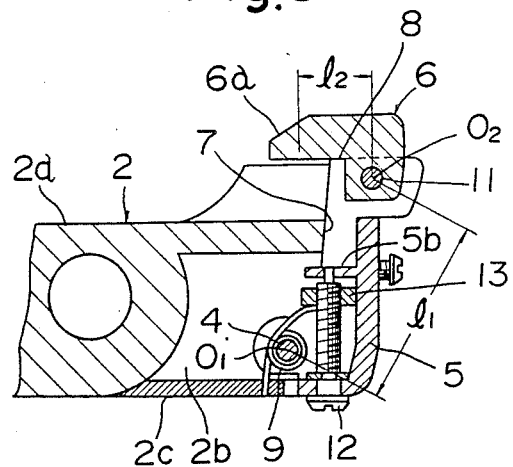
FIG. 5 is a sectional view taken along line V—V in FIG. 2.
Figure 6:
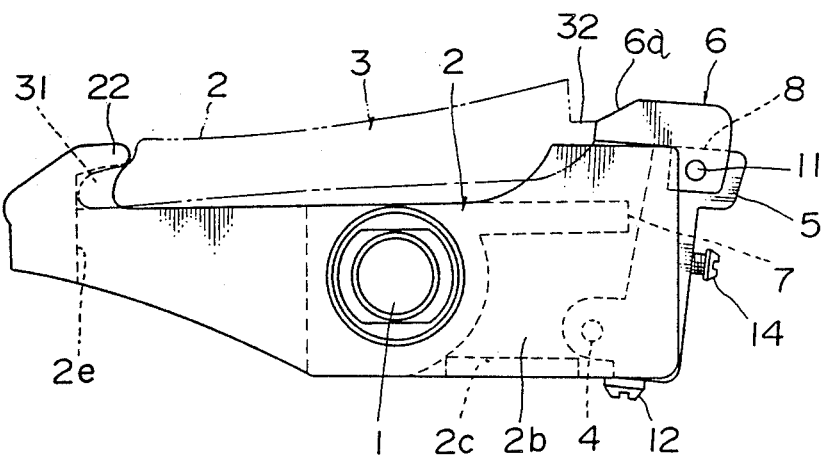
FIGS. 6 and 7 are illustrations showing operation of the pedal of the first embodiment.

First spring 9, as shown in FIG. 5, employs a torsion spring wound at its intermediate portion and extending at both ends tangentially of the wound portion. The intermediate wound portion is supported on pivot shaft 4. One end of first spring 9 is retained to cover 2c and the other end abuts against swinging member 5 such that it has a changeable position, so that a first vertically extending adjusting screw bolt 12 provided at swinging member 5 is rotatable to adjust the spring force of spring 9. In other words, first adjusting screw bolt 12 is rotatably mounted to the lower end of swinging member 5, and first spring 9 is retained at the other end thereof of adjusting screw bolt 12. A spring holder 13 rotatable relative to swinging member 5 is screwed with screw bolt 12, so that adjusting bolt 12 is rotated to vertically move spring holder 13, thereby enabling the spring force of first spring 9 to be adjusted. In addition, a holder 5b for the tip of adjusting screw bolt 12 is provided integrally with swinging member 5.

Figure 4:
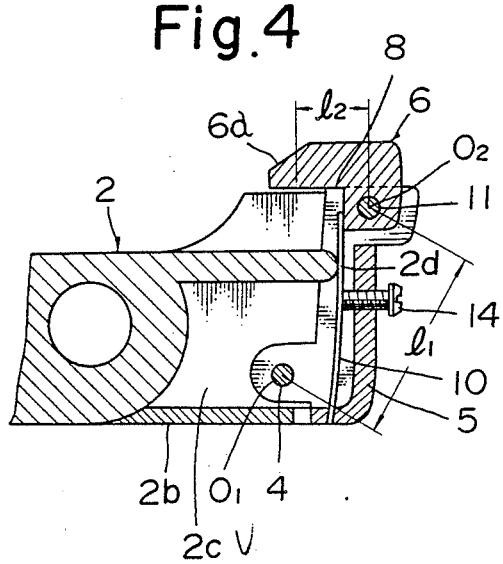
FIG. 4 is a sectional view taken along line IV—IV in FIG. 2.

Second spring 10, as shown in FIG. 4, is a vertically extending leaf spring, retained at its lower end to the lower end of swinging member 5. Spring 10 engages at its upper end with the front end surface of movable pawl 6, and can have its spring force adjusted by rotating a second adjusting screw bolt 14 screwable with swinging member 5. In other words, a spring holder 2d is provided at the rear end edge of pedal body 2, and second adjusting screw bolt 14 extending longitudinally of the pedal is screwably supported to a vertically intermediate portion of swinging member 5. Adjusting screw bolt 14 abuts at the tip thereof against the side surface of an intermediate portion of second spring 10, and adjusting screw bolt 14 rotates to bias the intermediate portion of second spring 10 toward spring holder 2d, thereby enabling a spring force of second spring 10 to be adjusted.

A biasing force applied to movable pawl 6 by second spring 10 toward second stoppers 8 is made larger than that applied to swinging member 5 by first spring 9 toward first stopper 7, thereby making shoe plate 3 easy to mount and hard to remove. Hence, movable pawl 6 is prevented from unexpectedly escaping from swinging member 5 when the pedal is kicked -up. In more detail, when a distance from the position 01 at which swinging member 5 is pivoted to pedal body 2 to position 02 at which movable member 5 is pivoted to swinging member 5 is represented by 11 and a distance from 02 to the position engaging with second engaging portion 32 is represented by 12, a product of the force of second spring 10 multiplied by distance 12 is made larger than a product of the force of first spring 9 multiplied by distance 11.

The impeding means for impeding shoe plate 3 from rearward movement with respect to pedal body 2 constitutes a pair of block members 15 provided at both widthwise ends of the rear portion of pedal body 2. Block members 15 project upwardly with respect to the foot bearing surface and oppose the rear end face of shoe plate 3. When shoe plate 3 is subjected to a rearward force resulting from the kick-up of the pedal during pedaling, the rear end edge of shoe plate 3 abuts against block members 15, thereby impeding shoe plate 3 from rearward movement.

In the first embodiment constructed as described above, front engaging portion 31 of shoe plate 3 is retained to fixing pawl 22 of pedal body 2 and rear engaging portion 32 of shoe plate 3 contacts at its lower surface with slope 6a so as to be depressed by the cyclist's foot.

Hence, movable pawl 6 is intensely urged toward second stoppers 8 and slope 6a is subjected to the rearward component of the urging force so that swinging member 5, in the condition in which movable pawl 6 is integral with swinging member 5, swings rearwardly against first spring 9 to disengage from the lower surface of rear engaging portion 32. Then, swinging member 5 is restored in position by the force of first spring 9 and the fore end of movable pawl 6 engages with rear engaging portion 32 so that shoe plate 3 is retained to movable pawl 6 to be non-movably mounted on pedal body 2. In this condition, since a biasing force applied to movable pawl 6 is set stronger than that applied to swinging member 5 and block members 15 for impeding rearward movement of shoe plate 3 are provided, there is no risk that movable pawl 6 kicked up by the pedal during pedaling will escape upwardly from pedal body 2. Accordingly, shoe plate 3 has a secure mounting condition.

Thus, swinging member 5 swings only when shoe plate 3 is mounted as described above, but movable pawl 6 does not swing, whereby a smaller treading force required to deflect first spring 9 having a smaller spring force than the spring force of second spring 10 can easily mount shoe plate 3 onto pedal body 2.

On the other hand, shoe plate 3 is removed from pedal body 2 such that the heel of the shoe is intensively raised upwardly, with the retained position of shoe plate 3 to fixing pawl 22 being employed as the fulcrum, and with the raising force applied by the shoe heel being applied from rear engaging portion 32 to movable pawl 6.

Figure 7:
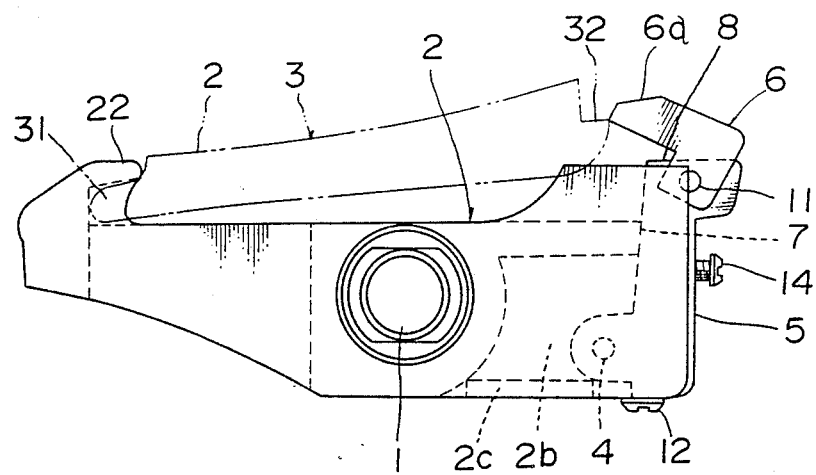

Since movable pawl 6 is pivoted to swinging member 5, the raising force swings movable pawl 6 only, but not swinging member 5. In this condition, as shown in FIG. 7, movable pawl 6 escapes upwardly and slantwise rearwardly from pedal body 2 against the force of second spring 10 and second engaging portion 32 disengages from movable pawl 6, thereby enabling shoe plate 3 to be removed. After the removal of shoe plate 3, movable pawl 6 is restored in position by second spring 10 to abut against second stoppers 8.

As described above, the downward treading operation and upward raising operation respectively are used to simply mount or remove the shoe plate to or from the pedal, so that the shoe plate, even when removed in an emergency, can be quickly removed.

Moreover, swinging member 5 formed as a separate member from movable pawl 6 is pivoted to pedal body 2, and movable pawl 6 is pivoted to swinging member 5. First and second springs 9 and 10 for swinging member 5 and movable pawl 6 respectively are used, whereby shoe plate 3 can be designed to be easy to mount and hard to remove onto and from pedal body 2. The biasing force applied to movable pawl 6 is made smaller than that applied to swinging member 5, thereby alternatively designing the shoe plate to be hard to mount and easy to remove. Also alternatively, the biasing forces applied to both movable pawl 6 and swinging member 5 can be made equal to each other and both relatively small in magnitude, thereby enabling shoe plate 3 to be designed to be easy to mount and remove. Thus, the spring forces of springs 9 and 10 are desirably selected to meet various specifications to thereby increase the degree of freedom to that extent.

Figure 8:
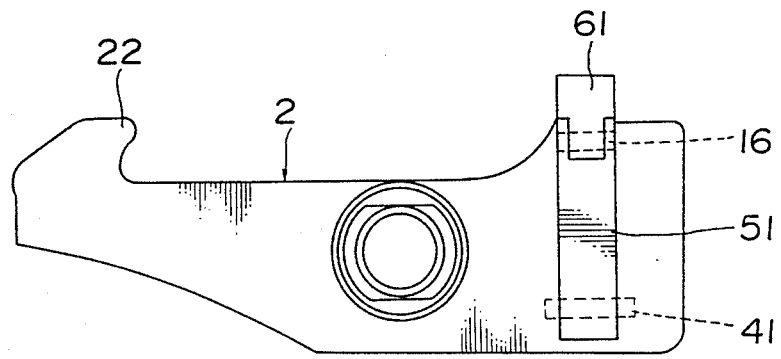
FIG. 8 is a front view of a second embodiment of the pedal of the invention.
Figure 9:
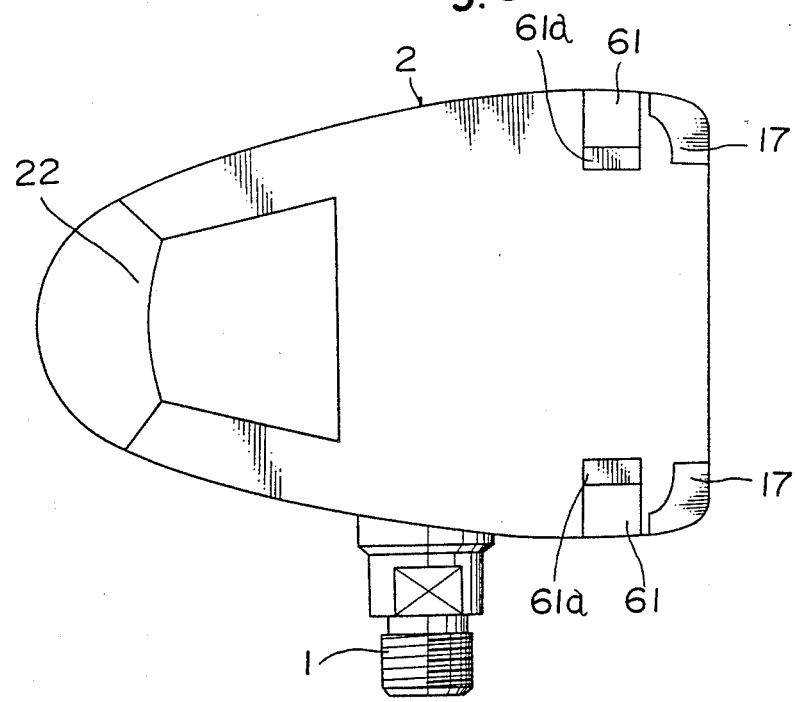
FIG. 9 is a plan view of the second embodiment.
Figure 10:
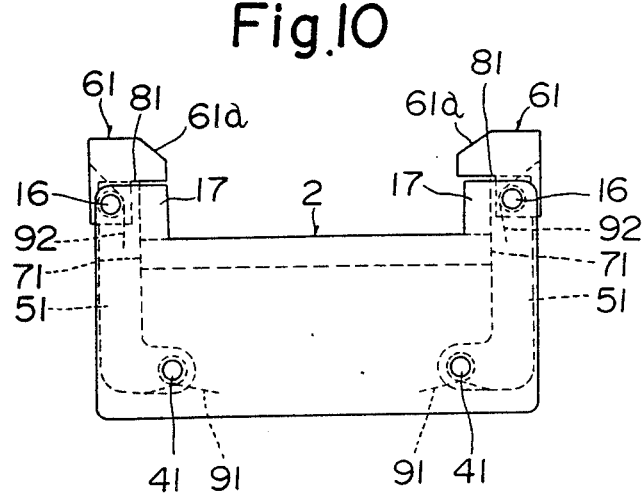
FIG. 10 is a side view of the second embodiment.

Alternatively, as shown in a second embodiment of the invention in FIGS. 8 through 10, swinging members 51 may be pivoted to pedal body 2 such that both dislodge widthwise outwardly with respect thereto and movable pawl 61 may be pivoted to swinging members 51 such that they dislodge slantwise upwardly rearwardly with respect to pedal body 2.

In the second embodiment illustrated in FIGS. 8 through 10, a pair of swinging members 51 are pivoted at both widthwise sides of the rear portion of pedal body 2 through pivot shafts 41 extending longitudinally of the pedal. Movable pawls 61 having slopes 61a are pivoted to the upper ends of swinging members 51 through shafts 16 parallel to pivot shafts 41 respectively. First stoppers 71 are provided at both side surfaces of pedal body 2, and second stoppers 81 are provided at the utmost end faces of swinging members 51 respectively. First springs 91 are provided between swinging members 51 and pedal body 2 respectively, and second springs 92 are provided between movable pawls 61 and swinging members 51 respectively. Block members 17 are provided at the rear portion of pedal body 2.

In addition, in the second embodiment, adjusting screw bolts also are provided for first and second springs 91 and 92 the same as in the first embodiment. Alternatively, block members opposite to the front surfaces of swinging members 51 may be provided at both side surfaces of shoe plate 3, thereby forming the aforesaid impeding means.

Also, the second embodiment can have an increased degree of freedom of design the same as in the first embodiment.

Also, in the first embodiment, first spring 9 employs a torsion spring, and second spring 10 employs a leaf spring, but the types of springs to be used are not particularly defined or limited.

Figure 11:
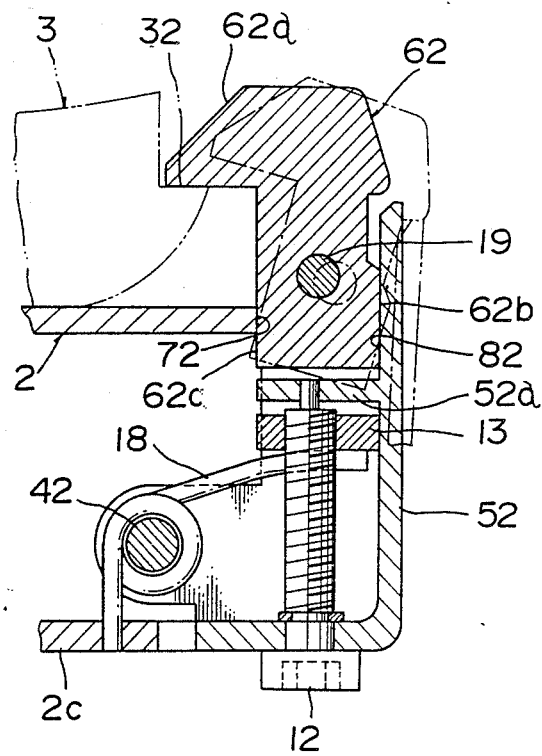
FIG. 11 is a longitudinal sectional view of a third embodiment of the pedal of the invention, showing only its principal portions.

Alternatively as shown in a third embodiment in FIG. 11, one spring may be used to bias the swinging member and movable pawl toward the stopper elements.

The third embodiment shown in FIG. 11 has a movable pawl 62 pivotally supported through a swinging member 52. Movable pawl 62 has a slope 62a. A spring 18 is interposed between pedal body 2 and swinging member 52.

More particularly, swinging member 52 is pivoted to the rearward lower portion of pedal body 2 through a pivot shaft 42, and at the upper portion of swinging member 52 is pivoted an intermediate portion of movable pawl 62 through a shaft 19. Front surface 62c of movable pawl 62 below the pivot position of movable pawl 62 abuts against a first stopper 72 at the rear end edge of pedal body 2 so as to restrict the swinging motion of swinging member 52 and movable pawl 62 toward pedal body 2. At the rear surface of the upper portion of swinging member 52 is provided a contact surface 62b at the rear surface of movable pawl 62 below the pivoting position thereof. Contact surface 62b abuts against a second stopper 82 at the upper portion of the front surface of swinging member 52 to thereby restrict the swinging motion of movable pawl 62 toward pedal body 2. On the other hand, spring 18 is interposed between swinging member 52 and pedal body 2 so that the spring force of spring 18 biases swinging member 52 toward a first stopper 72 and the reaction force biases swinging member 52 and in turn movable pawl 62 toward second stopper 82.

In the above-described construction, shoe plate 3, when removed from pedal body 2, is raised upwardly, whereby movable pawl 62 is intended to swing slantwise upwardly rearwardly around shaft 19 while causing movable pawl 62 to abut against first stopper 72. At this time, since contact surface 62b also abuts against second stopper 82 at swinging member 52 such that it is substantially restricted from swinging motion, the force of movable pawl 62 to swing rearwardly is transmitted in a leveraged manner to swinging member 52 at the contact point with first stopper 72 functioning as the fulcrum point, thereby rearwardly swinging member 52.

In brief, while movable pawl 62 is swinging rearwardly, swinging member 52 swings following the swinging motion of movable pawl 62 and finally shoe plate 3 is dismounted from pedal body 2. In this condition, the raising force applied to shoe plate 3 allows movable pawl 62 to swing largely in proportion to the amount of movement of swinging member 52, whereby rear engaging portion 32 disengages from movable pawl 62. Hence, even when a spring force is set which prevents movable pawl 62 from escaping or dislodging upwardly from pedal body 2 during pedaling action, the raising force for shoe plate 3 can easily disengage the rear engaging portion from movable pawl 62, such that the shoe plate is easy to mount and remove. In addition, a weak spring for biasing movable pawl 62 may be interposed between movable pawl 62 and swinging member 52. Also, spring 18, the same as first spring 9 in the first embodiment, employs a torsion spring wound at an intermediate portion thereof with both ends extending tangentially from this wound portion and with the wound portion of spring 18 being supported to pivot shaft 42, one end being retained to cover 2b for pedal body 2 and its other end abutting against swinging member 52 such that it has a changeable position. A first vertically extending adjusting screw bolt 12 provided at swinging member 52 is rotated to enable the spring force to be adjusted. In other words, first adjusting screw bolt 12 is rotatably mounted only to the lower end of swinging member 52. The other end of spring 18 is retained to adjusting screw bolt 12 and a spring holder 13 movable only relative to swinging member 52 screws with the same, whereby adjusting screw bolt 12 is rotated to vertically move spring holder 13 to enable the spring force of spring 18 to be adjusted. Also, swinging member 5 is integrally provided with a screw bolt holder 52a having a bore into which adjusting screw bolt 12 is inserted at its tip portion. In addition, in FIG. 11, second stopper 8 may be provided at pedal body 2.

As described above, when a single spring 18 is used for biasing swinging member 52 and movable pawl 62, the pivoting position thereof relative to swinging member 5 is displaced toward or away from the abutting position of movable pawl 62 against first stopper 72, thereby changing a force required to mount or dismount the shoe plate from the pedal body so as to increase the degree of freedom in design. In other words, the pivoting position of movable pawl 62 is spaced apart from the abutting position thereof against first stopper 72, thereby reducing the leverage of movable pawl 62, i.e., the ratio of the distance between the pivoting position to the swinging member 52 and the first stopper 72 to the distance between the pivoting position and the engaging position of rear engaging portion 32 and moreover reducing the spring force of spring 18. Hence, the shoe plate can be made such that it is easy to mount and hard to remove. Alternatively, the pivoting position of movable pawl 62 can be made closer to the abutting position thereof than the position in FIG. 11, thereby making shoe plate 3 hard to mount and easy to remove. Also, alternatively, the leverage can be increased and the spring 18 force reduced, thereby making the shoe plate easy to mount and remove. The leverage and the spring force of spring 18 can be selected as desired to simply meet various specifications.

Alternatively, pedal body 2 may be provided at its front portion with a window 2e as shown in FIG. 9 so that the impeding means for rearward movement of shoe plate 3 may utilize the end of window 2e.

As seen from the above description, the present invention is provided at the front portion of the pedal body with a fixing pawl and at its rear portion with a swinging member which is pivoted to the pedal body to be movable at its upper end toward or away from the pedal body. A movable pawl projecting at its fore end toward the pedal body and retaining the rear portion of the shoe plate is pivoted to the upper end of the swinging member such that its fore end is capable of escaping or dislodging from the pedal body. The swinging member and movable pawl are biased toward the pedal body to elastically contact with the stopper. Therefore, such construction is utilized to simply make the shoe plate alternatively easy to mount and hard to remove, hard to mount and easy to remove, or easy to mount and to remove. Hence, the degree of freedom in design is superior to that of conventional pedals.

Although several embodiments have been described above, they are merely exemplary of the invention and not be be construed as limiting, the invention being defined solely by the scope of the appended claims.

What is claimed is:

1. A pedal for a bicycle for use together with a shoe plate fixed to the sole of a shoe of a cyclist and provided at its front and rear portions with engaging portions respectively, said pedal comprising:
    a pedal shaft;
    a pedal body rotatably supported to said pedal shaft, said pedal body comprising a fixing pawl disposed at a front portion thereof, said fixing pawl comprising means for retaining said front engaging portion of said shoe plate and a swinging member disposed at a rear portion thereof, said swinging member being swingable at an upper portion thereof in a direction of moving toward or away from said pedal body, a movable pawl being provided at said upper portion of said swinging member, said movable pawl having a fore end which projects toward said pedal body, said fore end of said movable pawl comprising means for retaining said rear engaging portion of said shoe plate, said movable pawl being pivoted to said upper portion of said swinging member to enable said fore end thereof to move toward or away from said pedal body, said pedal body further comprising impeding means for impeding said shoe plate from rearward movement with respect to said pedal body;
    a stopper means for regulating respective swinging motions of said swinging member and said movable pawl in said direction of moving toward said pedal body; and
    a biasing means for biasing said swinging member and said movable pawl in said direction of moving toward said pedal body.

2. A pedal according to claim 1, wherein said swinging member and said movable pawl are swingable independently of each other, said biasing means comprising a first spring means for biasing said swinging member and a second spring means for biasing said movable pawl.

3. A pedal according to claim 2, wherein said first spring means is provided with adjusting means for adjusting a biasing force of said first springs means.

4. A pedal according to claim 2, wherein said second spring means is provided with adjusting means for adjusting a biasing force of said second spring means.

5. A pedal according to claim 2, wherein said stopper means comprises a first stopper provided on said pedal body for regulating said swinging motion of said swinging member in said direction of moving toward said pedal body and a second stopper provided on said swinging member for regulating said swinging motion of said movable pawl in said direction of moving toward said pedal body.

6. A pedal according to claim 1, wherein said stopper means comprises a first stopper provided on said pedal body for regulating said respective swinging motions of said swinging member and said movable pawl in said direction of moving toward said pedal body and a second stopper provided on said swinging member for regulating said swinging motion of said movable pawl in said direction of moving away from said pedal body, said movable pawl being provided with an abutting surface abutting against said first stopper, and said biasing means comprising a spring means for biasing said upper portion of said swinging member in said direction of moving toward said pedal body, said spring means being provided between said swinging member and said pedal body.

7. A pedal according to claim 6, wherein said spring means is provided with adjusting means for adjusting a biasing force of said spring means.

* * * * *